US011463467B2

(12) United States Patent
Rodriguez Bravo et al.

(10) Patent No.: US 11,463,467 B2
(45) Date of Patent: Oct. 4, 2022

(54) ADVANCED RISK EVALUATION FOR SERVERS

(71) Applicant: KYNDRYL, INC., New York, NY (US)

(72) Inventors: Cesar Augusto Rodriguez Bravo, Alajuela (CR); Kevin Jimenez Mendez, Heredia (CR); John Richard Feezell, Pikeville, TN (US); Andre Luis Soares, Sao Jose do Rio Preto (BR)

(73) Assignee: KYNDRYL, INC., New York, NY (US)

( * ) Notice: Subject to any disclaimer, the term of this patent is extended or adjusted under 35 U.S.C. 154(b) by 217 days.

(21) Appl. No.: 16/737,977

(22) Filed: Jan. 9, 2020

(65) Prior Publication Data

US 2021/0218765 A1    Jul. 15, 2021

(51) Int. Cl.
*H04L 9/40*       (2022.01)
*G06F 21/62*      (2013.01)
*G06F 21/57*      (2013.01)

(52) U.S. Cl.
CPC ........ *H04L 63/1433* (2013.01); *G06F 21/577* (2013.01); *G06F 21/6245* (2013.01)

(58) Field of Classification Search
CPC ............... H04L 63/1433; G06F 21/577; G06F 21/6245; G06F 21/46
USPC .......................................................... 726/25
See application file for complete search history.

(56) References Cited

U.S. PATENT DOCUMENTS 7,581,245 B2 *  8/2009  Rojewski ............... G06F 21/46
                                                        726/18
7,865,958 B2    1/2011  Lieblich et al.
(Continued)

FOREIGN PATENT DOCUMENTS

JP         4639084 B2     2/2011
JP         4833489 B2    12/2011

OTHER PUBLICATIONS

"The RSA Risk Engine", Copyright 2015 EMC Corporation, printed Oct. 1, 2019, 5 pages https://www.rsa.com/content/dam/en/solution-brief/rsa-risk-engine.pdf.
(Continued)

*Primary Examiner* — Jacob Lipman
(74) *Attorney, Agent, or Firm* — Ken Han; Andrew M. Calderon; Roberts Calderon Safran & Cole, P.C.

(57) ABSTRACT

Disclosed is a computer-implemented method for analyzing server for security vulnerabilities. The method includes selecting a first server from a plurality of servers, wherein the first sever includes a plurality of accounts. The method includes identifying, by a password vulnerability scanner, weak accounts in the plurality of accounts including a first weak account. The method includes determining, by a user risk engine, a user risk score for a user associated with the weak account. The method includes determining, by a server risk engine, a server risk score for the first server, wherein the server risk score is based on a set of server factors and a set of data factors. The method includes generating, by a smart risk scorer, an overall risk score for the first server. The method includes categorizing, based on the overall risk score of the first sever, a risk level for the first server.

20 Claims, 6 Drawing Sheets

(56) References Cited

U.S. PATENT DOCUMENTS

| | | | |
|---|---|---|---|
| 8,121,892 | B2 | 2/2012 | Baggett, Jr. et al. |
| 8,478,708 | B1 | 7/2013 | Larcom |
| 9,628,501 | B2 | 4/2017 | Ray et al. |
| 2006/0020814 | A1* | 1/2006 | Lieblich ............ H04L 63/20 713/182 |
| 2007/0101432 | A1* | 5/2007 | Carpenter ............ G06F 21/552 726/25 |
| 2013/0085953 | A1* | 4/2013 | Bhola ............ G06Q 50/01 705/319 |
| 2013/0097701 | A1* | 4/2013 | Moyle ............ H04L 63/20 726/22 |
| 2014/0137257 | A1 | 5/2014 | Martinez et al. |
| 2014/0325670 | A1 | 10/2014 | Singh et al. |
| 2018/0285797 | A1* | 10/2018 | Hu ............ G06Q 10/0635 |

OTHER PUBLICATIONS

Chung et al., "A Practical Security Risk Analysis Process and Tool for Information System", International Journal of Information Processing Systems, vol. 2, No. 2, Jun. 2006, 6 pages. https://www.semanticscholar.org/paper/A-Practical-Security-Risk-Analysis-Process-and-Tool-Chung-Kim/90f9e0926c24dcb2444e186e7df3c2aea1403bab.

Mell et al., "The NIST Definition of Cloud Computing", Recommendations of the National Institute of Standards and Technology, Special Publication 800-145, Sep. 2011, 7 pages.

\* cited by examiner

ADVANCED RISK EVALUATION FOR SERVERS

BACKGROUND

The present disclosure relates to information security, and, more specifically, to identifying security vulnerabilities in servers.

Many authoritative voices in the cybersecurity universe have opined about the imminent demise of the password as a function of authentication methodologies. Some large companies have tried to eliminate the password. However, passwords and user accounts are still common in a wide variety of computing applications.

SUMMARY

Disclosed is a computer-implemented method for analyzing a server for security vulnerabilities. The method includes selecting a first server from a plurality of servers, wherein the first sever includes a plurality of accounts. The method further includes identifying, by a password vulnerability scanner, weak accounts in the plurality of accounts including a first weak account. The method also includes determining, by a user risk engine, a user risk score for a user associated with the weak account. The method includes determining, by a server risk engine, a server risk score for the first server, wherein the server risk score is based on a set of server factors and a set of data factors. The method further includes generating, by a smart risk scorer, an overall risk score for the first server. The method also includes categorizing, based on the overall risk score of the first sever, a risk level for the first server. Further aspects of the present disclosure are directed to systems and computer program products containing functionality consistent with the method described above.

The present Summary is not intended to illustrate each aspect of, every implementation of, and/or every embodiment of the present disclosure.

BRIEF DESCRIPTION OF THE DRAWINGS

The drawings included in the present application are incorporated into, and form part of, the Specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate to information security, and, more specifically, to identifying security vulnerabilities in servers. Aspects of the present disclosure may be better appreciated in light of the aforementioned applications.

Many authoritative voices in the cybersecurity universe have opined about the imminent demise of the password as a function of authentication methodologies. Some large companies have tried to eliminate the password. However, passwords and user accounts are still common in a wide variety of computing applications.

Computers, servers, applications, and other system are generally protected by a simple, well known mechanism: passwords (or keys). There is a lot of information available to the public that explains good practices about creating, storing, using, and changing passwords. Despite all this, users still create and maintain passwords that are relatively easy to guess or crack.

Although passwords may be encrypted, particularly when stored on a computer, there are many tools which can be used to defeat this mechanism. These tools do not necessarily decrypt the protections but may use a brute force method. Some brute force methods include utilizing dictionaries of well-known and/or commonly used passwords (e.g. "password", etc.).

The risk associated with a weak password increases as the access level of the account increases. For example, a standard user is at less risk than an administrator, which is at less risk than a root account. In some cases, existing servers and systems are not compatible with newer cyber security products (e.g., dual factor authentication, biometrics, etc.). Therefore, a user-selected password is the sole security measure available for some servers.

Embodiments of the present disclosure identify high-risk servers and take action to remediate/reduce the risk to the servers from weak passwords. In some embodiments, weaknesses are identified using a password vulnerability scanner. In some embodiments, the password vulnerability scanner attempts to gain access to a server through user accounts. The attempts can include guessing passwords, generating passwords, using common passwords, and other techniques. In some embodiments, the password vulnerability scanner guesses passwords. The guesses may be based on information associated with the account. Names, birthdays, family members, addresses, phone numbers, sports teams, etc. may all be used as the basis for guessing passwords. In some embodiments, the guesses may include common information slightly modified. For example, if a name associated with user account is "Edgar" the guesses may include the name, the name with a number (e.g., Edgar1), and/or the name with a substituted letter (e.g., Ed8ar). The substituted letter may be replaced by a number, a symbol (e.g., !, $, etc.), and/or a different letter. In some embodiments, the guesses combine multiple pieces of information such as a name with a birth year (e.g., Edgar84, if Edgar has a birth year of 1984).

In some embodiments, the password vulnerability scanner includes a common password dictionary. The dictionary may include passwords that are common (e.g., "password"), or weak (e.g., "1234"). In some embodiments, the password vulnerability scanner attempts to login to the server by using all (or some) of the passwords in the password dictionary for each user account. Each time a weak password is found, the data is recorded in a result storage.

Running the password vulnerability scanner may require a large amount of computing resources. This is compounded as the number of different servers increases. At some point, it becomes impractical to scan every account on every server. Thus, embodiments of the present disclosure identify high-risk servers and prioritize the security of these servers. In some embodiments, a smart risk score (or overall score) is calculated for each server. In some embodiments, the smart risk score is based on a user risk score and a server risk score.

In some embodiments, a user risk engine calculates the user risk score. The user risk score is based on the results of user accounts across one or more analyzed servers. In some embodiments, the user risk engine runs the password vulnerability scanner and identifies weak accounts. In some embodiments, if a user risk score exceeds a risk threshold, then additional servers that contain accounts for that user may be prioritized to analyze the risk. In some embodiments, a remediating action is taken in response to the user risk score being above the risk threshold. The action may include disabling the account, deleting accounts, requiring password changes, notifying server administrators, and/or other similar actions.

In some embodiments, the server risk engine calculates a server risk score. The server risk score may be based on server factors and data factors. In some embodiments, server factors are based on the type of server and/or uses of the server. Each server is assigned a base score based on the server factors. Examples of server factors include network access (e.g., internet, intranet, etc.), testing, legacy, backup, high availability, and other similar factors. Each factor may increase or decrease the base score. For example, a testing server may have a lower base score than a critical equipment server, and an internet-connected server may have a higher base score than an intranet-only server.

In some embodiments, the data factors are related to the type(s) of data stored on or passing through the server. Examples of data factors includes, personally identifiable information, medical records, financial data, defense technology, encryption, and other types of data. Each data factor may increase or decrease the base score. In some embodiments, the server risk score is a combination of the server factors and the data factors. The server risk score may represent the potential harm (e.g., financial consequences, reputational consequences, legal consequences, etc.) if the server is breached.

In some embodiments, the smart risk score is used to determine how to determine which server(s) to analyze. When it is impossible to analyze all servers, some servers can be prioritized. In some embodiments, the prioritization is based one or more user risk scores. If a user is found to have a high-risk score, then servers where that user has accounts may be prioritized. As the number of high-risk users (users with a high score) increases, the higher priority a server may have. For example, a server that has three high-risk users may be prioritized over a server with one high-risk user. In some embodiments, the prioritization is based on the percentage of high-risk users.

In some embodiments, the servers to be analyzed are based on the server risk score. If a particular server has a high-risk score and/or high smart risk score, additional servers with similar factors may be prioritized to be analyzed.

In some embodiments, the servers to be analyzed are based on the user risk score and the server risk score. The scores may be combined in any way (e.g., multiplied, added, etc.) to prioritize (or rank) the servers. For example, in one embodiment, the user risk score may have more weight in determining future servers to be analyzed, in another embodiment the server risk score may have a higher weight, and in a third embodiment, they may be equally weighted.

Calculating smart risk scores will allow for better allocation of password vulnerability scanner resources and/or identify and remediate high-risk servers and users. This may prevent the allocation of resources to less important and lower risk servers.

The aforementioned advantages are example advantages, and embodiments exist that can contain all, some, or none of the aforementioned advantages while remaining within the spirit and scope of the present disclosure.

Figure 1:
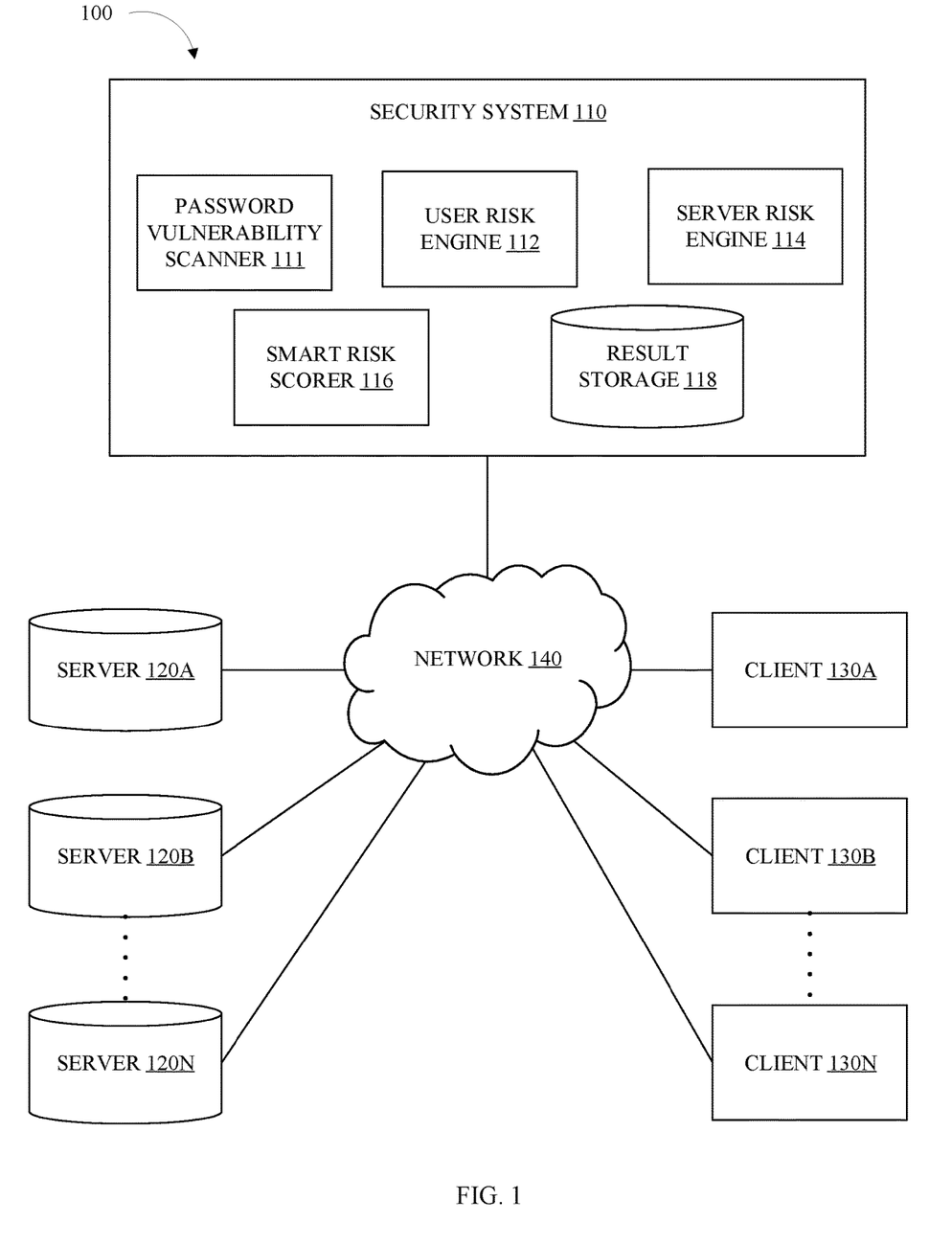
FIG. 1 illustrates a functional diagram of a computing environment suitable for operation of a security system, in accordance with some embodiments of the present disclosure.

Referring now to various embodiments of the disclosure in more detail, FIG. 1 is a representation of a computing environment 100, that is capable of running a server vulnerability system (or security system) in accordance with one or more embodiments of the present disclosure. Many modifications to the depicted environment may be made by those skilled in the art without departing from the scope of the disclosure as recited by the claims.

Computing environment 100 includes security system 110, server 120A, server 120B, through server 120N (collectively, "servers 120"), client 130A, client 130B, through client 130N (collectively, "clients 130"), and network 140. Network 140 can be, for example, a telecommunications network, a local area network (LAN), a wide area network (WAN), such as the Internet, or a combination of the three, and can include wired, wireless, or fiber optic connections. Network 140 may include one or more wired and/or wireless networks that are capable of receiving and transmitting data, voice, and/or video signals, including multimedia signals that include voice, data, and video information. In general, network 140 may be any combination of connections and protocols that will support communications between security system 110, servers 120, clients 130, and other computing devices (not shown) within computing environment 100.

Security system 110 can be a standalone computing device, a management server, a web server, a mobile computing device, or any other electronic device or computing system capable of receiving, sending, and processing data. In other embodiments, security system 110 can represent a server computing system utilizing multiple computers as a server system, such as in a cloud computing environment. In some embodiments, security system 110 represents a computing system utilizing clustered computers and components (e.g., database server computers, application server computers, etc.) that act as a single pool of seamless resources when accessed within computing environment 100.

In some embodiments, security system 110 is configured to analyze servers 120 for security vulnerabilities. In some embodiments, the vulnerabilities are related to one or more weak passwords associated with user accounts. In some embodiments, security system 110 is located within one or more of servers 120. The passwords may then be associated with user accounts, users, different servers, organizations, and other relevant association. Security system 110 may then use a combination of the factors to generate one or more vulnerability scores.

In some embodiments security system 110 is configured to remediate security vulnerabilities. The remediations may include one or more of notifying users, notifying administrators, locking accounts, prompting password changes, disabling accounts, deleting accounts, and other similar actions. In some embodiments security system 110 includes password vulnerability scanner 111, user risk engine 112, server risk engine 114, smart risk scorer 116, and result storage 118.

Password vulnerability scanner 111 can be any combination of hardware and/or software configured to identify weak passwords. In some embodiments, a weak password, can be any password that does not meet a predetermined standard. The standard may be based on one or more of length, type of characters (e.g., uppercase, lowercase, etc.), similarity to username, and other factors. The standard may be based on the type of account. For example, a standard account may have a lower standard than an administrator account. In some embodiments, a weak password is any password cracked by the password vulnerability scanner.

In some embodiments, password vulnerability scanner 111 attempts to gain access to a server via a user account. This may include the scanner attempting to login while guessing passwords. In some embodiments, the guesses are based on a dictionary of common and/or unsecure passwords. The scan may guess each password in the dictionary, or only a subset of the passwords in the password dictionary. In some embodiments, the guessed passwords are based on account information. The account information may include names (first and/or last), usernames, addresses, phone numbers, birthdate, and/or any other data associated with the user account. In some embodiments, the guess is slight variations of the data associated with the user account. For example, a name associated with an account may include "Stephen." The guess may be the name (e.g., Stephen), the name with number (e.g., Stephen1, Stephen2, etc.), the name with a substituted letter (e.g., st3phen), an alternate spelling (e.g., steven), and/or any combination of the foregoing. Continuing the example, the account may also include and a birthday for Stephen as Mar. 25, 1987. The guesses may be a number based on the birthdate (0325, 0387, 03251987, etc.). The guess may also be combination of name and birthday (e.g., stephen87, steph25, etc.).

User risk engine 112 can be any combination of hardware and/or software configured to evaluate and determine security risk for one or more users. In some embodiments, the security risk for a user is based on a user account having a weak password. In some embodiments, weak passwords are identified using password vulnerability scanner 111.

In some embodiments, user risk engine 112 calculates a user risk score. The user risk score may be based on the number of associated accounts that have a weak password. It is possible for one user to have more than one account on a single server. In some embodiments, the user risk score is based on user accounts across more than one server. The risk score may be the number of weak accounts associated with the user.

In some embodiments, the user risk score is correlated to the weakness of the password. For example, if a password is "1234", that may be a higher risk than if the password is the name with a number substituted for a letter (e.g., st3phen). In some embodiments, the user risk score is based on the type of account or, said differently, based on the type of access of the account. For example, a user risk score correlated to an admin account may be higher than the user risk score for a standard account, all other factors being equal.

In some embodiments, the risk score may be divided into categories. Each category may be linked to a score delineation. For example, on a scale of 0-10, low risk may be a score a 0-1, medium risk 2-5, high risk 6-8, and critical risk may be 9 or higher. There may be any number of categories. In some embodiments, the categories are based on percentages. In these embodiments, there is a number of users in each category from each server. For example, the top 3% of user risk scores are classified as critical risk, the next 15% as high-risk, and so on. In some embodiments, each server is categorized into one of the categories, based on their user score Server risk engine 114 can be any combination of hardware and/or software configured to determine the security vulnerability for a server. In some embodiments, server risk engine calculates a server risk score for each analyzed server. In some embodiments the server risk score is based on a server base score. The base score is a score determined based on known factors of the server. In some embodiments the server risk score is determined by adjusting the base score. The adjustments may be made based on the data factors and/or server factors.

In some embodiments, the server risk score is based on server factors. Server factors are any factors that may add or diminish security risks based on configuration of the server. In some embodiments, each server is assigned a base score, based on the factors. Factors may include the type of server and/or a use of server. In some embodiments, the server factors may include internet connectivity, intranet connectivity, public access, critical server, password storage encrypted, high availability server, backup server, production server, testing server, sandbox server, legacy server, and/or unpatched server.

In some embodiments the server risk score and/or the server base score is based on networks connected to the server. For example, a server connected to the internet may have a higher score than a server only connected to an intranet, or a local network, or, said differently, the base score (or score adjustment) may be higher for the server connected to the internet than the server connected to an intranet. In some embodiments, the factors are related to the use of the server. A production server and/or high use servers may have a higher base score than testing servers and backup servers. In some embodiments, the factors are based on the age/components of the server. Some older (legacy) servers may not support additional security processes (e.g., two factor authentication). It follows, the legacy servers may have a higher base score and a newer server that supports additional security features may have a lower base score.

In some embodiments, the base scores and/or the values associated with the factors can be adjusted. In some embodiments, the base score is a summation of each value of the relative factors. In some embodiments, the base score is calculated using any combination of the values associated with the factors.

In some embodiments, the server risk score is based on data factors. Data factors may be based on the type of data that is stored on the server. In some embodiments, the data factors include a value. More important/valuable data may be correlated with a higher server risk score. For example, customer data may have a high data risk score/factors and test data may have a low data risk score/factors. In some embodiments, the data factors incorporate potential consequences of losing the data. For example, if personal data is lost, there may be large monetary fines and/or loss of trust. The data risk factor/score may be higher than for training data, where there are no monetary consequences.

In some embodiments, the server risk score is based on a combination of the server factors and the data factors. In some embodiments, the data factors are used to adjust the base score. The values associated with the factors may be combined in any way (addition, subtraction, multiplication, etc.). In some embodiments, they are added together. In some embodiments, one or more of the data factors and/or server factors include a multiplier effect. For example, the risk associated with any server that contains customer information may increase the base score by a factor of two. In some embodiments, the server risk score is based on the number of data factors. For example, if a server includes customer data and medical data, it may have a higher server risk score than a sever that has only one type.

In some embodiments, the server risk score is correlated to one or more categories. Each category may be linked to a score delineation. For, example, low risk may be a score a 0-1, medium risk 2-5, high risk 6-8, and critical risk may be 9 or higher. In some embodiments, the categories and/or delineations may be altered.

Smart risk scorer 116 can be any combination of hardware and/or software configured to determine a smart server risk score (or overall risk score). In some embodiments, the smart risk score is based on the server factors and the data factors. The factors may be combined in any manner (add, multiply, weighted, etc.) to determine the overall score. In some embodiments, the smart score is correlated to one or more categories. Each category may be linked to score delineation.

In some embodiments, smart risk scorer can identify additional servers with similar server factors, data factors, server factor scores, and/or user factor scores. In some embodiments, servers with similar characteristics of relatively high-risk servers, may be marked (or prioritized) for future analysis. For example, assume that servers 120A, 120B, and 120N are scheduled to be analyzed, but smart risk scorer 116 may identify that there is another server 120C (not shown) that has similar characteristics to server 120A. If server 120A is found to have a smart score associated with an extreme risk, then rather than analyze servers 120B and 120N, server 120C may then be analyzed ahead of servers 120B and 120N.

Result storage 118 can be any combination of hardware and/or software to store the results of security system 110, or its components. Result storage 118 may be a database and/or a storage system, and/or a capable of storing any type of data in a structured format, such as, for example, one or more tables, structured data, queryable data structures, and/or a rectangular data format. In some embodiments, results storage 118 groups all data for a user across one or more servers.

Servers 120 can be, for example, server computers with high-speed connections to network 140. In addition, server 120 provides preemptive data caching services to client devices. Also, servers 120 may represent a cluster of servers in one or more data centers. Alternatively, servers 120 may represent computing nodes in one or more cloud environments.

In some embodiments, servers 120 are accessed through user accounts. A user can establish one or more user account on each server. Each user account includes a password, and each user account has an owner, wherein the user is the account owner. In some embodiments, servers 120 include multiple tiers of user accounts. The tiers may be associated with the type of access associated with the user account. The account types may include in increasing accessibility, a standard account, a user account, and a root account. In some embodiments, each server 120 has one or more server administrator. The administrator may have the ability to create, delete, suspend, lock, and perform other functions associated with the account's server 120. The administrator may receiver notifications (e.g., emails) regarding users with weak passwords and/or high user risk scores.

Clients 130 can be any type of data processing systems, such as, for example, network computers, laptop computers, handheld computers, smart phones, smart televisions, and the like, with wire or wireless communication links to network 140. Users of client 130 may utilize clients 130 to access and utilize the preemptive data caching services provided by servers 120.

In some embodiments, clients 130 can be used by a user to create one or more user accounts on servers 120. In some embodiments, clients 130 may be used by a bad actor to attempt to access servers 130 without authorization, using one of the user's user accounts.

Figure 2:
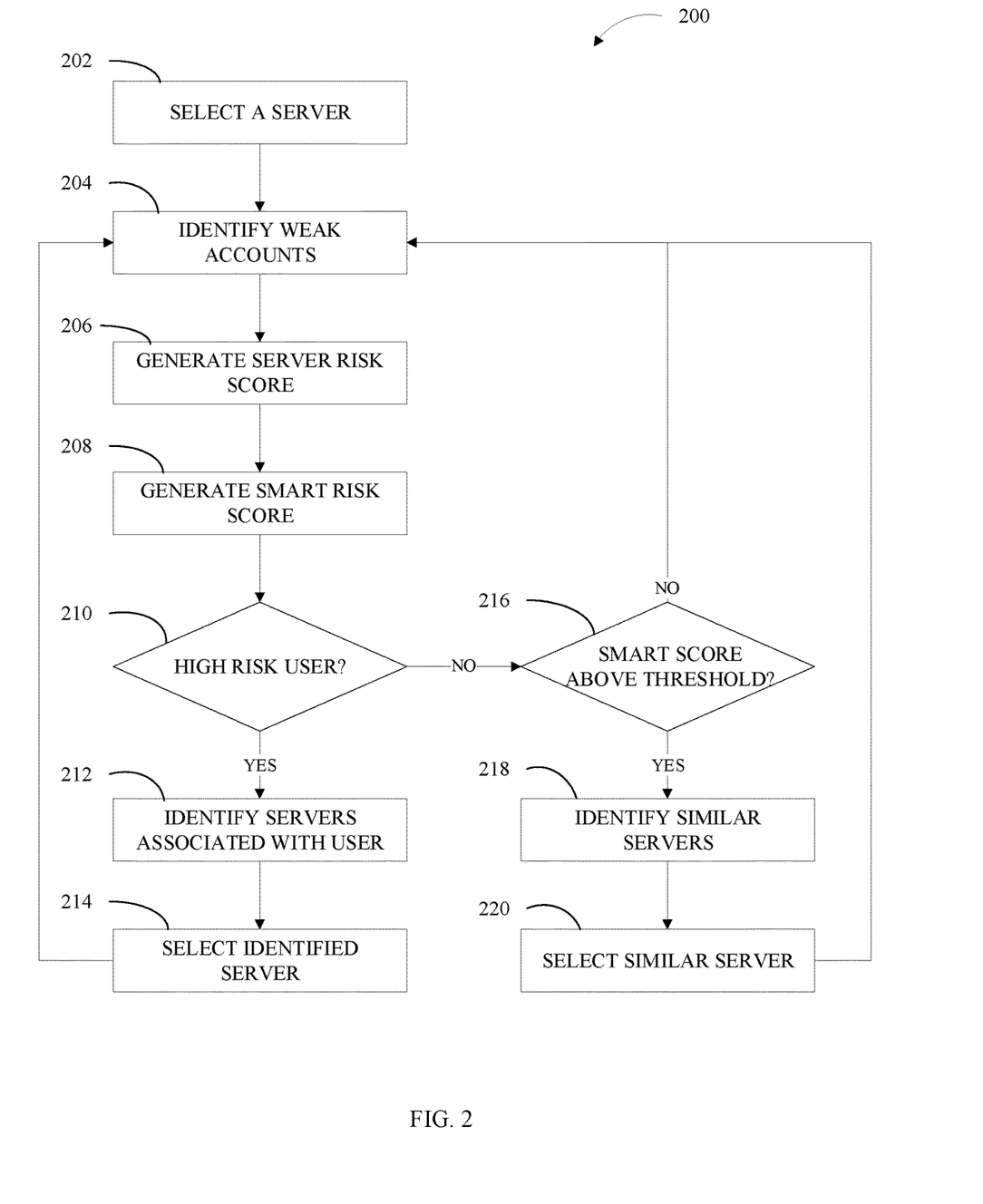
FIG. 2 illustrates a flow chart of an example method to identify high-risk server in accordance with some embodiments of the present disclosure.

FIG. 2 depicts a flowchart of an example method, method 200, for identifying high-risk servers to analyze for vulnerabilities, that can be performed in a computing environment (e.g., computing environment 100 and/or security system 110). One or more of the advantages and improvements described above can be realized by the method 200, consistent with various embodiments of the present disclosure.

Method 200 can be implemented by one or more processors, a computing device, security system 110, or a different combination of hardware and/or software. In various embodiments, the various operations of method 200 are performed by one or more of security system 110 or its subcomponents, servers 120, or clients 130. The operations of method 200 will be described as being performed by security system 110.

At operation 202, security system 110 selects a server to analyze. In some embodiments, the selection is random. In some embodiments, the selection is based on the base score. In some embodiments, an order for each server to analyze is generated. Then the first in line may be selected. In some embodiments, the selection is based on the number of use accounts in the server. The server with the highest number of accounts may be analyzed first.

At operation 204, security system 110 identifies weak user accounts on the selected server. In some embodiments, the weak user accounts are identified by running password vulnerability scanner 111. In some embodiments, operation 204 includes identifying users correlated to the weak user accounts. Each instance of a weak account may be recorded in result storage 118. Results may be aggregated by user and/or any other category. In some embodiments, operation 204 includes generating a user risk score for each user on the server.

At operation 206 security system 110 generates a server risk score. In some embodiments, the server risk score is generated by server risk engine 114. In some embodiments, the server risk score is based on based server factors and data factors.

At operation 208, security system 110 generates a smart risk score (or an overall risk score) for the server. In some embodiments, the score is generated by smart risk scorer 116. In some embodiments, the smart score is based on the user risk scores generated in operation 204 and/or the server risk score generated in operation 206. In some embodiments, method 200 ends at operation 208. For example, a server administrator may desire to track a server smart risk score over a long period of time (e.g., one a month for a year). This may allow the administrator to track the success of previous remediation actions.

At operation 210, security system 110 determines if there are high-risk users associated with the server. A high-risk user may be any user that a user account with a weak password. In some embodiments, operation 210 is based on the results of operation 204. In some embodiments, a user is high-risk if their user risk score is above a user risk threshold. If it is determined there is a high-risk user (210:YES), then security system 110 proceeds to operation 212. If it is determined there is not a high-risk user (210:NO), then security system 110 proceeds to operation 216.

At operation 212, security system 110 identifies additional servers associated with the high-risk users. In some embodiments, the servers are identified by scanning additional servers for the user.

At operation 214, security system 110 selects one or more of the identified servers. In some embodiments, if there are multiple identified servers, the next server may be selected in a manner consistent with operation 202. In response to selecting an identified server, security system 110 returns to operation 204.

At operation 216, security system 110 determines if the server smart score is above a predetermined threshold. If it is determined the smart score is above the threshold (210:YES), then security system 110 proceeds to operation 218. If it is determined the smart score is below the threshold (210:NO), then security system 110 returns to operation 204.

At operation 218, security system 110 identifies similar servers. In some embodiments, similar servers are servers that have a similar set of data factors and/or server factors as the current server. A different server may be considered similar if it has any similar factors. In some embodiments, the amount of similarity must be above a threshold to be similar. The similarity threshold may be based on percentage of similar factors, on a number of factors (data and/or server), and/or other similar standards.

At operation 220, security system 110 selects similar servers. In some embodiments, servers with higher base scores are prioritized. In some embodiments, if there are multiple servers with similar factors, the server is selected consistent with operation 202. In some embodiments, security system 110 returns to operation 204 in response to selecting a similar server.

Figure 3:
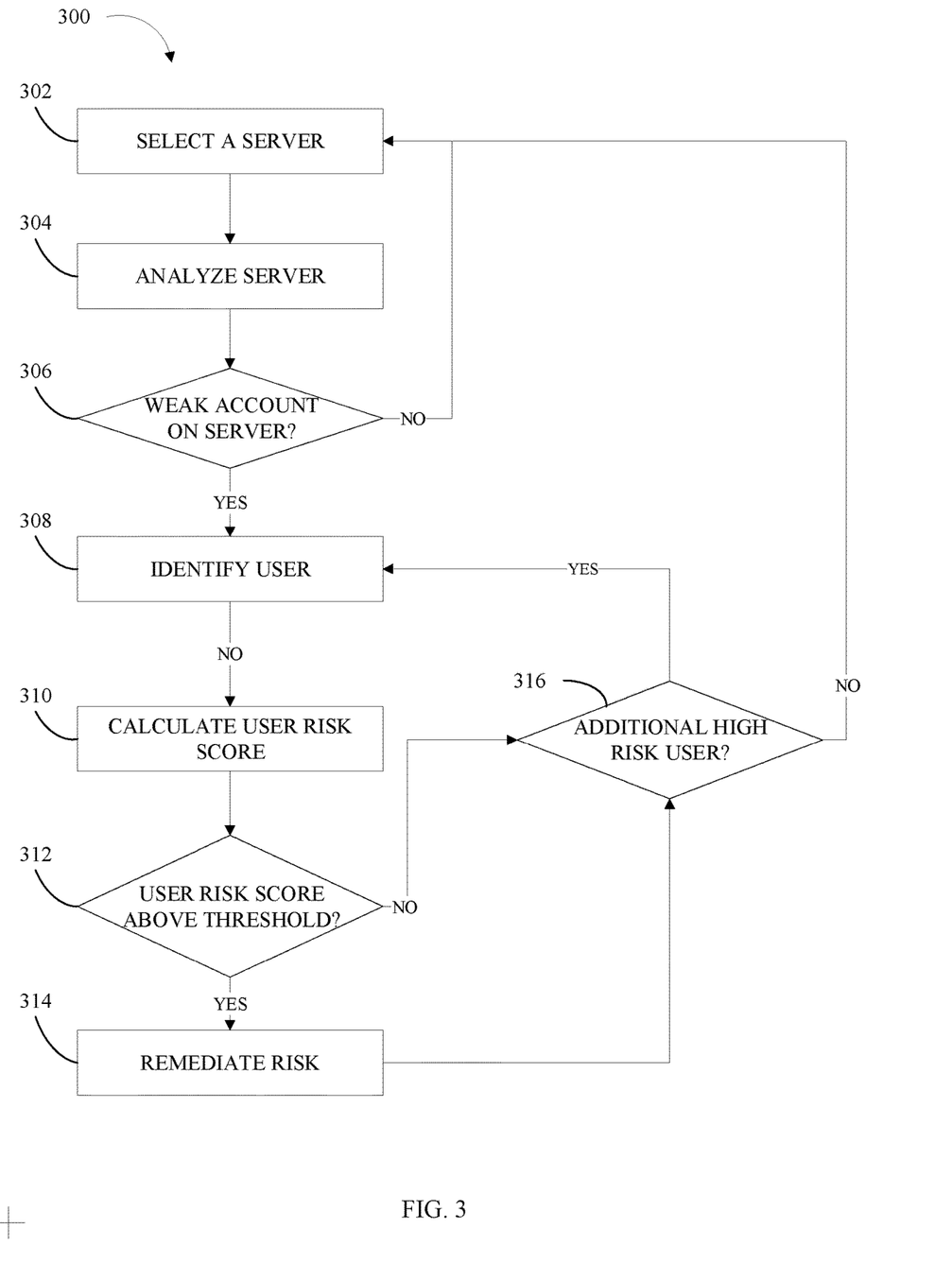
FIG. 3 illustrates a flow chart of an example method to remediate high-risk accounts in accordance with some embodiments of the present disclosure.

FIG. 3 depicts a flowchart of an example method, method 300 for reducing risk to servers, that can be performed in a computing environment (e.g., computing environment 100 and/or security system 110). One or more of the advantages and improvements described above can be realized by the method 300, consistent with various embodiments of the present disclosure.

Method 300 can be implemented by one or more processors, a computing device, security system 110, or a different combination of hardware and/or software. In various embodiments, the various operations of method 300 are performed by one or more of security system 110 or its subcomponents, servers 120, or clients 130. The operations of method 200 will be described as being performed by security system 110.

At operation 302, security system 110 selects a server. In some embodiments, operation 302 is consistent with operation 202 of method 200. At operation 304, security system 110 analyzes the server. In some embodiments, operation 304 is consistent with operations 204 and 206 of method 200.

At operation 306, security system 110 determines if the server includes a weak account. In some embodiments, an account is weak if it includes a weak password. In some embodiments, the weak accounts are identified by password vulnerability scanner 111. If it is determined there is weak account (306:YES), then security system 110 proceeds to operation 208. If it is determined there is not weak account (306:NO), then security system 110 returns to operation 302.

At operation 308, security system 110 identifies a user associated with the weak account. At operation 310, security system 110 calculates the user risk score. In some embodiments, the user risk score is generated by user risk engine 112. The risk score may be based on one or more of: the number of weak accounts (across one or more servers) associated with the user, the type of servers with the weak accounts, the risk of the weak passwords, and/or the account types associated with the weak passwords.

At operation 312, security system 110 determines if the user risk score is above a predetermined threshold. The predetermined threshold (a user risk threshold) can be based on a number, a percentile, and/or any other factor. If it is determined the user risks score is above the threshold (312:YES) then security system 110 proceeds to operation 314. If it is determined the user risk score is not above the threshold (312:NO), then security system 110 proceeds to operation 316.

At operation 314, security system 110 remediates the risk. In some embodiments, remediation includes notifying one or more parties of the risk. The notifications may be sent in response to determining the user risk score exceeds the threshold. The user, a manager (and/or colleague, and/or supervisor) of the user, the server administrators, and/or other relevant persons may be notified. In some embodiments, the notification includes an email that identifies each known user account with a weak password.

In some embodiments, the remediation includes an action to strengthen the password. The strengthening action may include one or more of, deleting the accounts, disabling the accounts, requiring password change, prompting for password change, and/or recommending a password change. In some embodiments, the action may differ based on the type of account. For example, a root account will be disabled, an administrator account will prompt for passwords to be changed, and a standard account may recommend a password change. In some embodiments, the strengthening action may be based on the user risk score. For example, a user in the highest category (e.g., extreme risk), may have accounts disabled, and a user in a middle category (e.g., moderate risk), may receive a prompt to change the password. In some embodiments, the strengthening action is based on user information. For example, if a user has left the company or changed jobs, the strengthening action may be to delete the account.

At operation 316, security system 110 determines if there is an addition weak account (or high-risk user) on the server. In some embodiments, operation 316 is consistent with operation 306 except it may exclude accounts from the remediated user. If security system 110 identifies an additional weak account (316:YES), then security system 110 returns to operation 208. If security system 110 does not identify an additional weak password (316:NO), then security system 110 returns to operation 202.

In some embodiments, method 200 and 300 occur concurrently. For example, operations 202 and 302 may be the same server and selected at the same time. Then security system 110 can step through each method as appropriate with preceding results.

Figure 4:
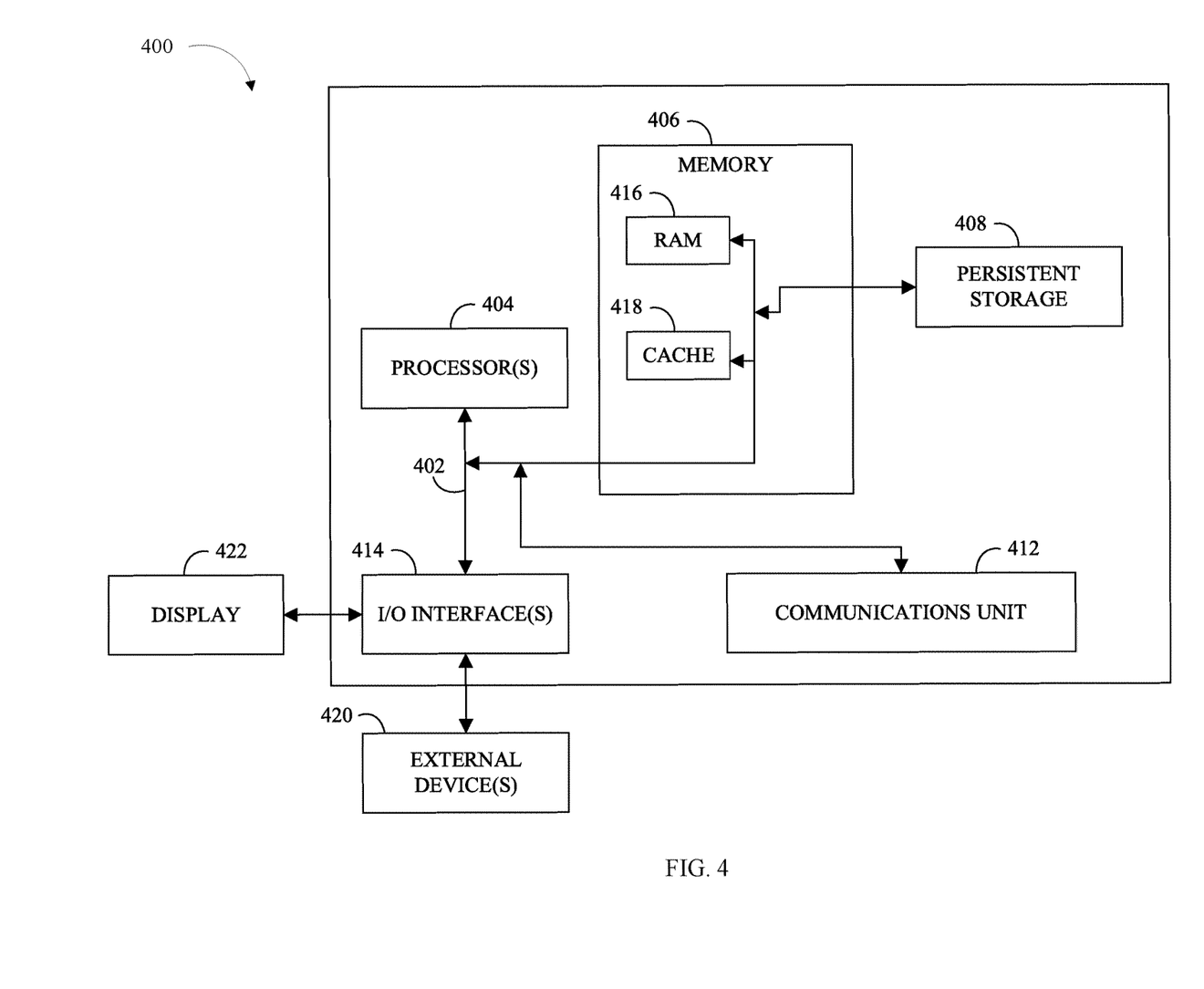
FIG. 4 illustrates a block diagram of an example computer system capable of operating a security system, in accordance with embodiments of the present disclosure.

FIG. 4 is a block diagram depicting components of a computer 400 suitable for advanced risk evaluation risk of servers, in accordance with at least one embodiment of the invention. In an embodiment, computer 400 is representative of security system 110, servers 120, and/or clients 130 (shown in FIG. 1). FIG. 4 displays the computer 400, one or more processor(s) 404 (including one or more computer processors), a communications fabric 402, a memory 406 including, a RAM 416, and a cache 418, a persistent storage 408, a communications unit 412, I/O interfaces 414, a display 422, and external devices 420. It should be appreciated that FIG. 4 provides only an illustration of one embodiment and does not imply any limitations with regard to the environments in which different embodiments may be implemented. Many modifications to the depicted environment may be made.

As depicted, the computer 400 operates over the communications fabric 402, which provides communications between the computer processor(s) 404, memory 406, persistent storage 408, communications unit 412, and input/output (I/O) interface(s) 414. The communications fabric 402 may be implemented with any architecture suitable for passing data or control information between the processors 404 (e.g., microprocessors, communications processors, and network processors), the memory 406, the external devices 420, and any other hardware components within a system. For example, the communications fabric 402 may be implemented with one or more buses.

The memory 406 and persistent storage 408 are computer readable storage media. In the depicted embodiment, the memory 406 comprises a random access memory (RAM) 416 and a cache 418. In general, the memory 406 may comprise any suitable volatile or non-volatile one or more computer readable storage media.

Program instructions for security system 110, servers 120, and/or clients 130, may be stored in the persistent storage 408, or more generally, any computer readable storage media, for execution by one or more of the respective computer processors 404 via one or more memories of the memory 406. The persistent storage 408 may be a magnetic hard disk drive, a solid state disk drive, a semiconductor storage device, read-only memory (ROM), electronically erasable programmable read-only memory (EEPROM), flash memory, or any other computer readable storage media that is capable of storing program instructions or digital information.

The media used by the persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of the persistent storage 408.

The communications unit 412, in these examples, provides for communications with other data processing systems or devices. In these examples, the communications unit 412 may comprise one or more network interface cards. The communications unit 412 may provide communications through the use of either or both physical and wireless communications links. In the context of some embodiments of the present invention, the source of the various input data may be physically remote to the computer 400 such that the input data may be received and the output similarly transmitted via the communications unit 412.

The I/O interface(s) 414 allow for input and output of data with other devices that may operate in conjunction with the computer 400. For example, the I/O interface 414 may provide a connection to the external devices 420, which may be as a keyboard, keypad, a touch screen, or other suitable input devices. External devices 420 may also include portable computer readable storage media, for example thumb drives, portable optical or magnetic disks, and memory cards. Software and data used to practice embodiments of the present invention may be stored on such portable computer readable storage media and may be loaded onto the persistent storage 408 via the I/O interface(s) 414. The I/O interface(s) 414 may similarly connect to a display 422. The display 422 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
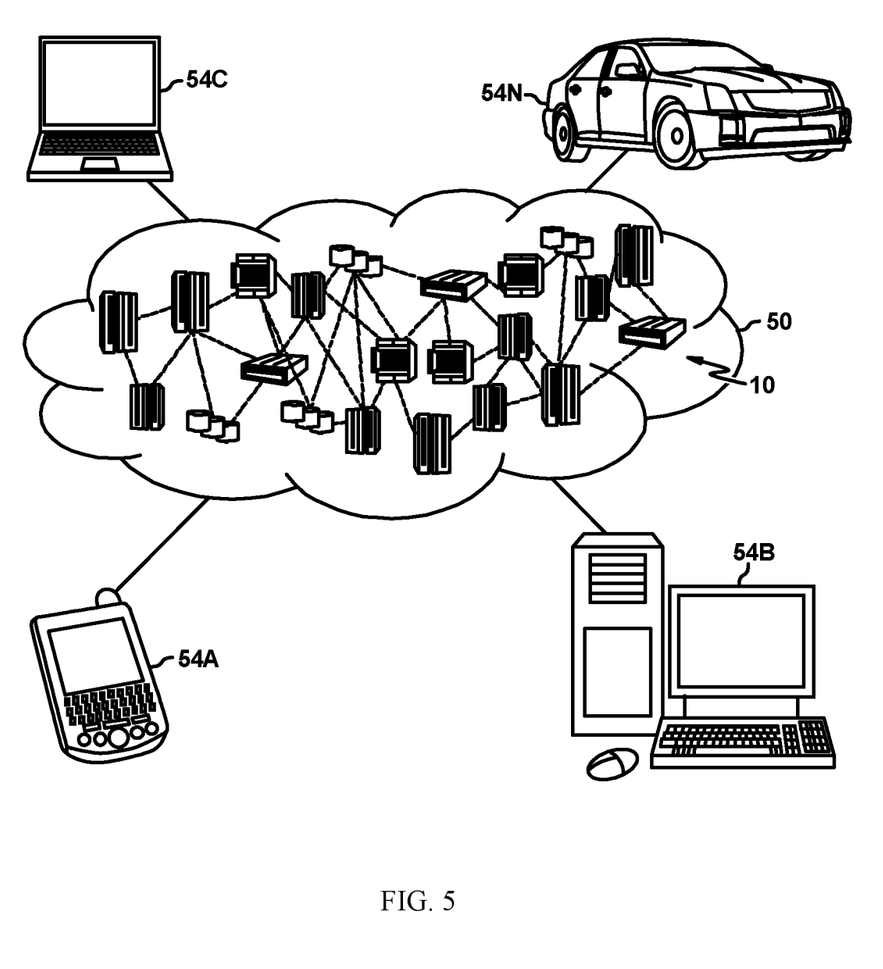
FIG. 5 depicts a cloud computing environment, in accordance with some embodiments of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 6:
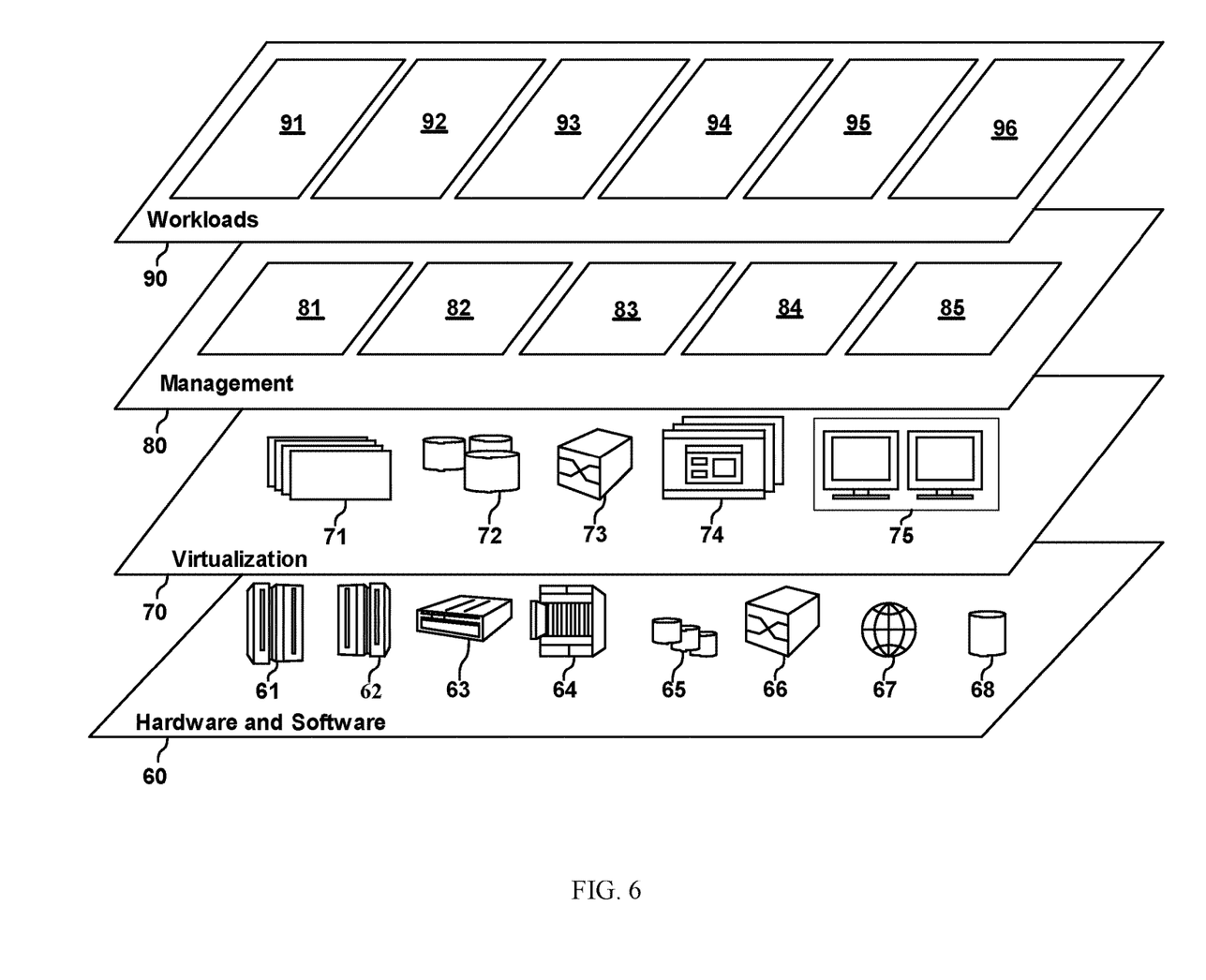
FIG. 6 depicts abstraction model layers, in accordance with some embodiments of the present disclosure.

Referring now to FIG. 6, a set of functional abstraction layers provided by cloud computing environment 50 (FIG. 5) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and server vulnerability analysis 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for analyzing a server for security vulnerabilities, the method comprising:
   selecting a first server from a plurality of servers, wherein the first sever includes a plurality of accounts;
   identifying, by a password vulnerability scanner, weak passwords that indicate weak accounts in the plurality of accounts including a first weak account;
   determining, by a user risk engine, a user risk score for a user associated with the first weak account;
   determining, by a server risk engine, a server risk score for the first server indicating potential harm from a password vulnerability security breach of the first server, wherein the server risk score is based on a set of server factors and a set of data factors, wherein the server factors include at least one of a type of the server and use of the server and the data factors include a value of a data stored on the first server based on a potential consequence of losing the data, the type of the server includes at least one of an age of the server and components of the server, and the use of the server includes at least one of how often the server is accessed and whether the server is a critical server, backup server, production server, testing server, or sandbox server;

generating, by a smart risk scorer, an overall risk score for the first server, wherein the overall risk score is based on the user risk score and the server risk score;

categorizing, based on the overall risk score of the first sever, a risk level for the first server; and determining, based on the user risk score or the server risk score, a second server from the plurality of servers to analyze for a risk level of the second server.

2. The method of claim 1, further comprising:
associating a first user with the first weak account, wherein the first user is an owner of the first weak account; and
identifying the second server of the plurality of servers, wherein the second server includes a user account associated with the first user.

3. The method of claim 1, further comprising:
determining the overall server score is above a server risk threshold; and
identifying, in response to the overall server being above the server risk threshold,
a third server of the plurality of servers, wherein the third server and the first server have at least one data factor and one server factor in common.

4. The method of claim 1, wherein the risk level for the first server is categorized into one of a plurality of categories, wherein each category is delineated based on the overall risk score, and a high risk server is prioritized for future analysis of the security vulnerabilities.

5. The method of claim 1, wherein identifying the first weak password further comprises:
generating, by the password vulnerability scanner, a guess password, wherein the guess is a name associated with the user.

6. The method of claim 1, wherein determining the server risk score further comprises:
generating, based on the server factors, a base score, wherein the server factors represent uses of the first server; and
adjusting, based on the data factors, the base score, wherein the data factors represent types of data in the first server.

7. The method of claim 6, wherein the data factors are selected from the group consisting of: personally identifiable information, medical records, financial data, defense data, and encryption; and wherein the server factors are selected from the group consisting of: internet connectivity, intranet connectivity, public access, critical server, password storage encrypted, high availability server, backup server, production server, testing server, sandbox server, legacy server, and unpatched server.

8. The method of claim 1, wherein the password vulnerability scanner includes a dictionary of passwords.

9. The method of claim 8, wherein a password for the first weak account is included in the dictionary of passwords.

10. The method of claim 1, further comprising:
associating a user to each weak account of the plurality of accounts, including a first user associated with the first weak account;
associating the first user to other weak accounts on other servers; and
calculating, for the first user, a first user risk score.

11. The method of claim 10, further comprising:
determining the first user risk score is above a user risk threshold; and
remediating, in response to determining the first user risk score is above the user risk threshold, the first weak account.

12. The method of claim 11, wherein remediating the first weak account includes disabling the first weak account based on the first user risk score indicating a high risk.

13. The method of claim 11, wherein remediating the first weak account includes prompting the first user to update a password associated with the first weak account based on the first user risk score indicating a medium risk.

14. The method of claim 11, wherein remediating the first weak account includes notifying a system administrator that the first user risk score is above the user risk threshold.

15. A system comprising:
a processor; and
a computer-readable storage medium communicatively coupled to the processor and storing program instructions which, when executed by the processor, are configured to cause the processor to:
select a first server from a plurality of servers, wherein the first sever includes a plurality of accounts;
identify, by a password vulnerability scanner, weak passwords that indicate weak accounts in the plurality of accounts including a first weak account;
determine, by a user risk engine, a user risk score for a user associated with the weak account;
determine, by a server risk engine, a server risk score for the first server indicating potential harm from a password vulnerability security breach of the first server, wherein the server risk score is based on a set of server factors and a set of data factors, wherein the server factors include at least one of a type of the server and use of the server and the data factors include a value of a data stored on the first server based on a potential consequence of losing the data, wherein the type of the server includes at least one of an age of the server and components of the server, and the use of the server includes at least one of how often the server is accessed and whether the server is a critical server, backup server, production server, testing server, or sandbox server;
generate, by a smart risk scorer, an overall risk score for the first server, wherein the overall risk score is based on the user risk score and the server risk score;
categorize, based on the overall risk score of the first sever, a risk level for the first server; and
determine, based on the user risk score or the server risk score, a second server from the plurality of servers to analyze for a risk level of the second server.

16. The system of claim 15, wherein the program instructions are further configured to cause the processor to:
associate a user to each weak account of the plurality of accounts, including a first user associated with the first weak account; and
calculate, for the first user, a first user risk score.

17. The system of claim 16, wherein the program instructions are further configured to cause the processor to:

determine the first user risk score is above a user risk threshold; and remediate, in response to determining the first user risk score is above the user risk threshold, the first weak account.

18. A computer program product, the computer program product comprising a computer readable storage medium having program instructions embodied therewith, the program instructions executable by a processing unit to cause the processing unit to:

select a first server from a plurality of servers, wherein the first sever includes a plurality of accounts;

identify, by a password vulnerability scanner, weak passwords that indicate weak accounts in the plurality of accounts including a first weak account;

determine, by a user risk engine, a user risk score for a user associated with the weak account;

determine, by a server risk engine, a server risk score for the first server indicating potential harm from a password vulnerability security breach of the first server, wherein the server risk score is based on a set of server factors and a set of data factors, wherein the server factors include at least one of a type of the server and use of the server and the data factors include a value of a data stored on the first server based on a potential consequence of losing the data, wherein the type of the server includes at least one of an age of the server and communication connections of the server, and the use of the server includes at least one of how often the server is accessed and whether the server is a critical server, backup server, production server, testing server, or sandbox server;

generate, by a smart risk scorer, an overall risk score for the first server, wherein the overall risk score is based on the user risk score and the server risk score;

categorize, based on the overall risk score of the first sever, a risk level for the first server;

track an overall risk score of the first server over a predetermined period of time; and determine, based on the user risk score or the server risk score, a second server from the plurality of servers to analyze for a risk level of the second server.

19. The computer program product of claim of claim 18, wherein the program instructions are further configured to cause the processing unit to:

associate a user to each weak account of the plurality of accounts, including a first user associated with the first weak account; and calculate, for the first user, a first user risk score.

20. The computer program product of claim of claim 19, wherein the program instructions are further configured to cause the processing unit to:

determine the first user risk score is above a user risk threshold; and remediate, in response to determining the first user risk score is above the user risk threshold, the first weak account.

* * * * *